(12) United States Patent
Eberhardt et al.

(10) Patent No.: US 6,809,872 B2
(45) Date of Patent: Oct. 26, 2004

(54) HEAD-UP DISPLAY WITH AN ADJUSTING DEVICE FOR A MIRROR

(75) Inventors: Bernd Eberhardt, Dieburg (DE); Franz-Peter Schmidt, Bad Homburg (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/236,446

(22) Filed: Sep. 5, 2002

(65) Prior Publication Data

US 2003/0165025 A1 Sep. 4, 2003

(30) Foreign Application Priority Data

Sep. 10, 2001 (DE) .......................... 101 44 491

(51) Int. Cl.⁷ ........................ G02B 27/14; G09G 5/00
(52) U.S. Cl. ........................ 359/630; 359/632; 345/7
(58) Field of Search ........................ 359/630, 631, 359/632, 618, 871–877; 345/7–9

(56) References Cited

U.S. PATENT DOCUMENTS

| 4,837,551 A | * 6/1989 | Iino .......................... 345/7 |
| 5,059,956 A | * 10/1991 | Iino .......................... 359/630 |
| 5,506,595 A | 4/1996 | Fukano et al. |

FOREIGN PATENT DOCUMENTS

| DE | 4125070 | 2/1992 | | |
| DE | 10044221 | 4/2001 | | |
| EP | 1291701 A1 | * 3/2003 | ............ | G02B/27/01 |
| JP | 08106071 A | * 4/1996 | ............ | G02F/1/13 |
| JP | 408227498 A | * 9/1996 | ............ | G08G/1/0969 |
| JP | 0200109073 A | * 4/2001 | ............ | B06K/35/00 |

OTHER PUBLICATIONS

RD 315008 A, Jul. 1990, Anonymous.*

* cited by examiner

Primary Examiner—Georgia Epps
Assistant Examiner—Alicia M. Harrington
(74) Attorney, Agent, or Firm—Martin A. Farber

(57) ABSTRACT

A head-up display in which the light of an image-forming device (10) can be projected onto a projection surface (12) via at least one mirror (1), and the at least one mirror (1) can be rotated about a first axis of rotation (3) by an adjusting device (2, 4, 5, 6, 7, 8), and so the position of an image that can be projected onto the projection surface (12) can be varied. The adjusting device has at least one sloping segment (5, 6) that is mounted in a fashion capable of rotation about a second axis of rotation (9), the second axis of rotation (9) not being perpendicular to the surface of the at least one sloping segment (5, 6), the at least one mirror (1) is connected to a supporting unit (2, 2a, 2b), the supporting unit (2, 2a, 2b) is pressed against the sloping segment (5, 6) at a spacing from the second axis of rotation, and by rotating the at least one sloping segment (5, 6), the supporting unit (2, 2a, 2b) slides over the sloping segment (5, 6), and the mirror (1) is thereby rotated about the first axis of rotation (3).

7 Claims, 2 Drawing Sheets

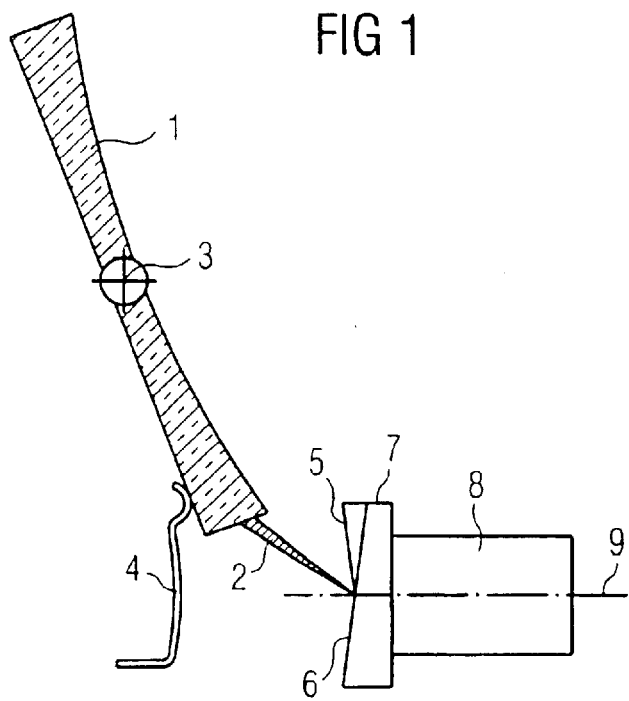
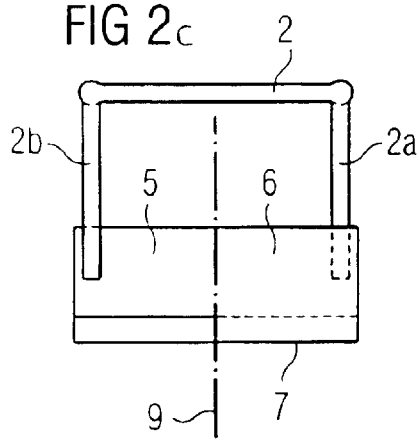
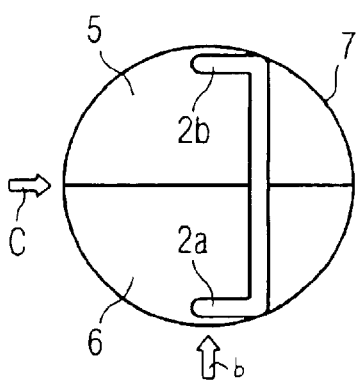
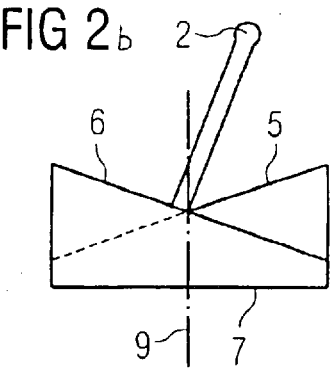

HEAD-UP DISPLAY WITH AN ADJUSTING DEVICE FOR A MIRROR

FIELD AND BACKGROUND TO THE INVENTION

The invention relates to a head-up display with an adjusting device for a mirror, particularly for motor vehicles. Known from the prior art is a head-up display in which the light of an image-forming device can be projected onto a projection surface via at least one mirror, it being possible for the at least one mirror to be rotated about a first axis of rotation by means of an adjusting device, and so the position of an image projected onto the projection surface can be varied. It is known from the prior art for such mirrors to be adjusted via manual adjusting devices or via electromechanical adjusting devices of complicated design. The overall space required and the high financial outlay are disadvantageous in this case.

SUMMARY OF THE INVENTION

It is therefore the object of the invention to specify an adjusting device for a head-up display that is of simple design and can be produced cost-effectively and moreover requires little overall space. This object is achieved by virtue of the fact that the adjusting device has a sloping segment that is mounted in a fashion capable of rotation about a second axis of rotation, the at least one mirror being connected to a supporting unit that is arranged at a spacing from the first axis of rotation. Furthermore, the supporting unit is pressed against the sloping segment at the spacing from the first axis of rotation. By rotating the sloping segment about the second axis of rotation, the supporting surface slides on the sloping segment such that the mirror is rotated about the first axis of rotation. The position of the projected image on the projection surface is varied thereby.

The invention can also be implemented by virtue of the fact that the supporting surface is rotated instead of the sloping segment. Such a design is described by claim 4.

By virtue of the fact that at least two sloping segments are present on which in each case at least one supporting surface slides, the tilting forces on a torque shaft of the sloping segments are minimized. The situation is the same when the supporting surfaces are rotated instead of the sloping segments.

A plurality of sloping segments can be implemented in the form of a cam in a particularly simple fashion. The mechanical design and the electronic drive of the adjusting device are of particularly simple configuration when a stepping motor is provided as drive for the rotations about the second axis of rotation of the sloping segments or the supporting surfaces. It is thereby possible in some circumstances for the position to be set very accurately without additional position sensors even in the absence of gearing.

BRIEF DESCRIPTION OF THE INVENTION

Figure 3:
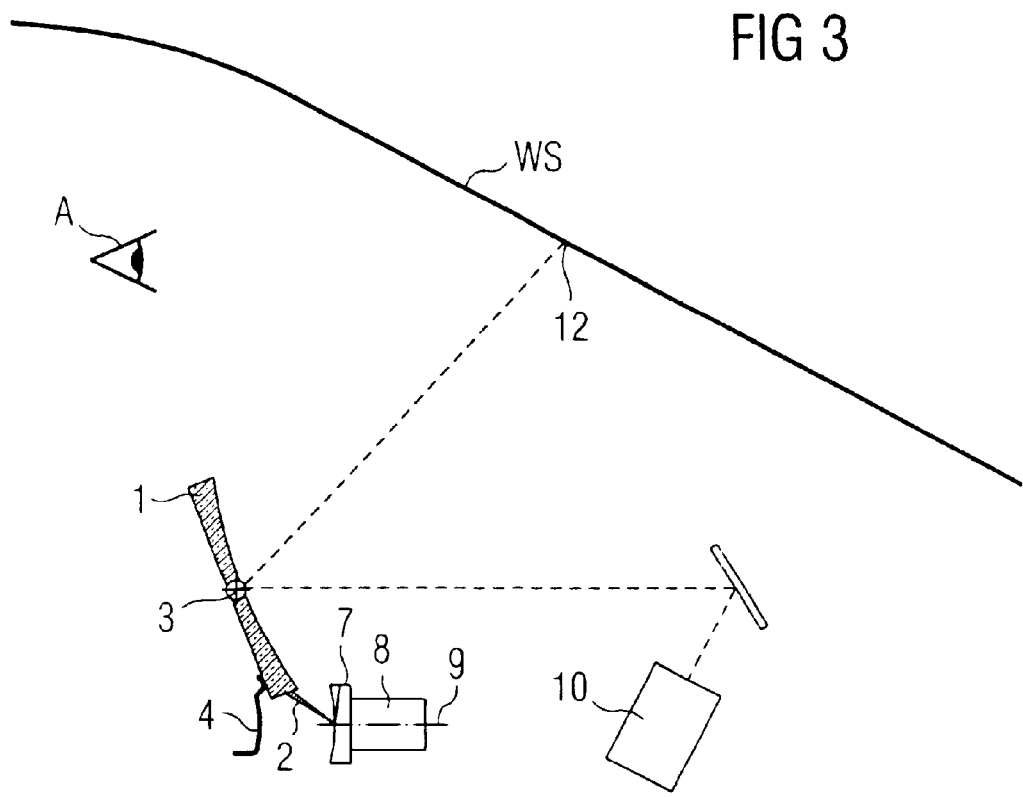
Figure 4:
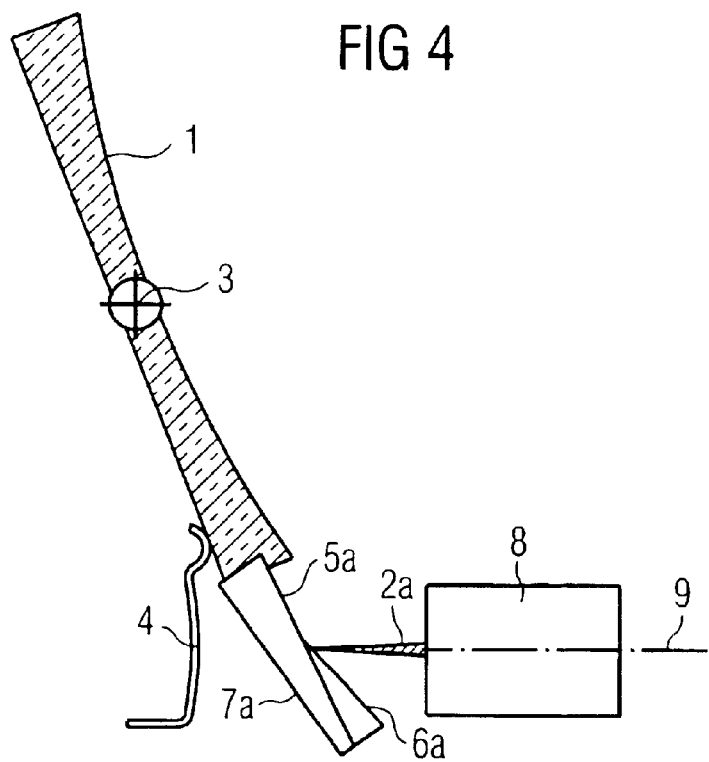

The invention is explained in more detail below with the aid of the illustrated figures, in which:

FIG. 1 shows a mirror of a head-up display with a particularly preferred adjusting device according to the invention, FIG. 2 comprising FIGS. 2a, 2b, and 2c shows a particularly preferred axial cam cooperating with a pair of pins, FIG. 3 shows the partial view of a vehicle with a head-up display and adjustable mirror according to FIGS. 1 and 2, FIG. 4 shows a modification of the adjusting device from FIG. 1.

DETAILED DESCRIPTION OF THE PREFERRED EMBODIMENT

A mirror 1 is connected to a pair of pins 2 in FIG. 1. The mirror 1 is mounted in a fashion capable of rotation about a first axis of rotation 3. Also to be seen is a spring 4, sloping segments 5, 6 of an axial cam 7, and a stepping motor 8. The spring 4 presses against the mirror 1. As a result, the pair of pins 2 is pressed against the sloping segments 5, 6 of the axial cam 7. The stepping motor 8 and the axial cam 7 are mounted in a fashion capable of rotation about a second axis of rotation 9. As soon as the stepping motor 8 rotates the axial cam 7 about the axis of rotation 9, the pair of pins 2 slides on the sloping segments 5, 6 of the axial cam 7. As a result, the pair of pins 2 is displaced axially in the direction of the second axis of rotation 9, and so the mirror 1 is rotated about the first axis of rotation 3. The axial cam 7 is to be seen in FIG. 2a cooperating with the pair of pins 2. The pair of pins 2 has the pins 2a, 2b, which in each case bear against a sloping segment 5, 6. The sloping segments 5, 6 respectively cover 180° of an axis rotation, the slopes of the two segments being the same, but offset by 180°. The view of the axial cam 7 from direction b is illustrated in FIG. 2b, while the view of the axial cam 7 from direction c is illustrated correspondingly in FIG. 2c. Two or more sloping segments on the axial cam prevent tilting forces, which would otherwise load the motor shaft in the event of only one pin. In the present exemplary embodiment, the surfaces of the sloping segments are represented as flat surfaces, and are therefore particularly easy to produce. However, it is also possible for the surface to be of a different configuration, for example in the form of a worm.

An example of a complete head-up display in a motor vehicle having the adjusting device according to the invention is to be seen in FIG. 3. Visible in addition to the already described elements are an image-forming device 10, a fixed mirror 11, a windshield WS of a motor vehicle and an eye A of a user of the motor vehicle. An image is formed in the image-forming device 10. This can be formed, for example, by a backlightable liquid crystal display, or by a light-emitting diode matrix. The image formed in the image-forming device 10 is projected via the mirrors 11 and 1 onto the windshield in the projection region 12 such that the eye A perceives an image behind the windshield. The projection region 12 can be displaced by rotating the mirror 1 about the first axis of rotation 3.

FIG. 4 shows a kinematic reversal of the exemplary embodiment from FIG. 1. An axial cam 7A with sloping segments 5A, 6A is connected to the mirror 1, while a pair of pins 2A is mounted in a fashion capable of rotation about the second axis of rotation 9. The sloping segments 5A, 6A are pressed against the pair of pins 2A. The axial cam 7A is displaced in the axial direction of the second axis of rotation 9 by rotating the pair of pins 2A about the second axis of rotation 9.

We claim:

1. A head-up display in which light of an image-forming device (10) can be projected onto a projection surface (12) via at least one mirror (1), and the at least one mirror (1) can be rotated about a first axis of rotation (3) by means of an adjusting device (2, 4, 5, 6, 7, 8), and so the position of an image that can be projected onto the projection surface (12) can be varied, wherein the adjusting device has at least one sloping segment (5, 6) that and is mounted for rotation about a second axis of rotation (9), the second axis of rotation (9)

not being perpendicular to a surface of the at least one sloping segment (5, 6), wherein the at least one mirror (1) is connected to a supporting unit (2, 2a, 2b), wherein the supporting unit (2, 2a, 2b) is pressed against the sloping segment (5, 6) at a spacing from the second axis of rotation, and wherein by rotating the at least one sloping segment (5, 6) about the second axis of rotation, the supporting unit (2, 2a, 2b) slides over the at least one sloping, segment (5, 6), and the mirror (1) is thereby rotated about the first axis of rotation (3).

2. The head-up display as claimed in claim 1, wherein there are at least two of said sloping segments (5, 6) formed as an axial cam (7), there is a second supporting unit, and said supporting units (2, 2a, 2b) slide on respective ones of the sloping segments.

3. The head-up display as claimed in claim 2, wherein the supporting units are formed as pins.

4. The head-up display as claimed in claim 1, further comprising a drive for the rotation about the second axis of rotation, said drive comprising a stepping motor.

5. A head-up display in which light of an image-forming device (10) can be projected via at least one mirror (1) onto a projection surface (12), and the at least one mirror (1) can be rotated by means of an adjusting device (2, 4, 5, 6, 7, 8) about a first axis of rotation (3), and so the position of an image that can be projected onto the projection surface (12) can be varied, wherein the at least one mirror (1) is connected to a sloping segment (5A, 6A) at a spacing from the first axis of rotation (3), wherein a supporting surface is present that bears against the sloping segment (5A, 6A) at said spacing for rotation about a second axis of rotation, the sloping segment (5A, 6A) not being arranged perpendicular to the second axis of rotation, such that due to a rotation of the support surface about the second axis of rotation, the supporting surface slides over the sloping segment (5A, 6A) and the mirror is thereby rotated about the first axis of rotation (3).

6. The head-up display as claimed in claim 5, further comprising a second sloping segment and a second supporting surface, wherein at least two of said sloping segments (5A, 6A) are present against which respective ones of said supporting surfaces bear.

7. The head-up display as claimed in claim 5, further comprising a drive for the rotation about the second axis of rotation, said drive comprising a stepping motor.

* * * * *